W. N. AMORY.
SHOCK ABSORBER FOR VEHICLES.
APPLICATION FILED JUNE 5, 1918.

1,337,579.

Patented Apr. 20, 1920.
3 SHEETS—SHEET 1.

William N. Amory
Inventor

By his Attorney

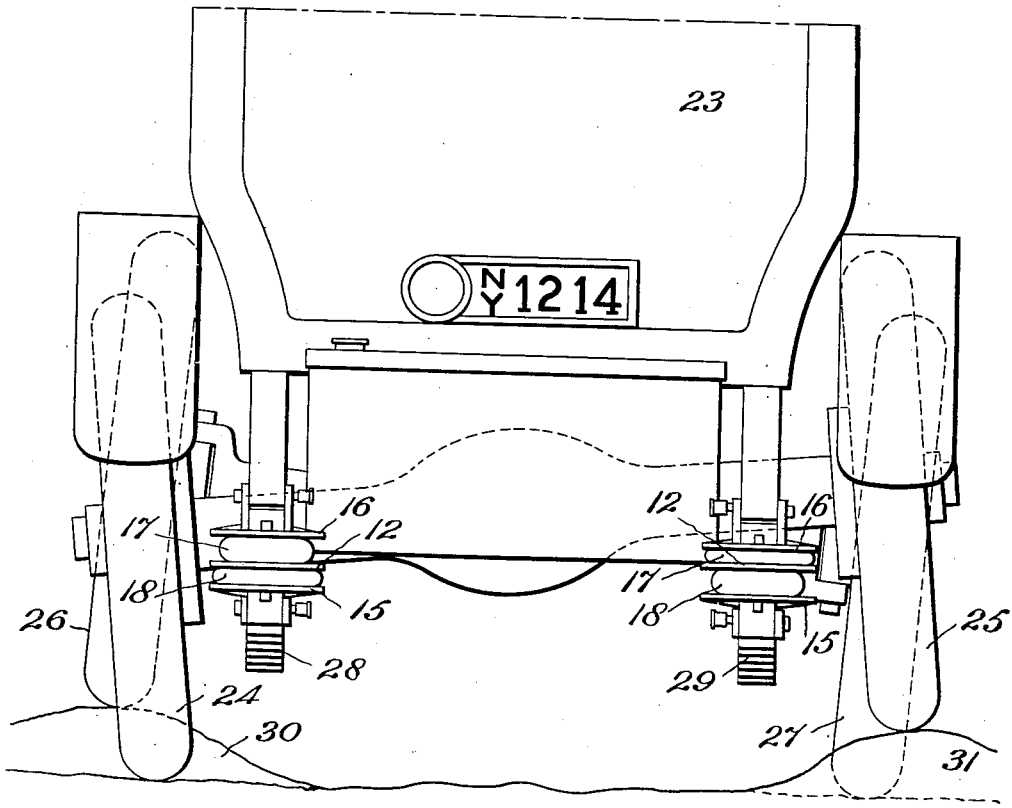
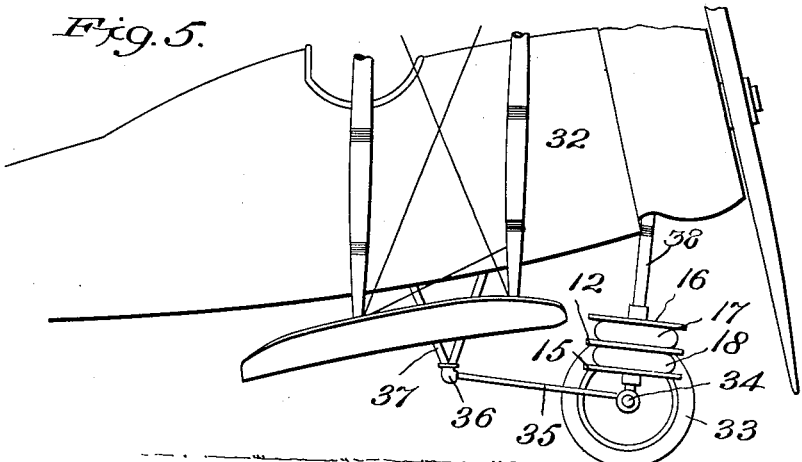

W. N. AMORY.
SHOCK ABSORBER FOR VEHICLES.
APPLICATION FILED JUNE 5, 1918.

1,337,579.

Patented Apr. 20, 1920
3 SHEETS—SHEET 3.

INVENTOR
William N. Amory
BY
Attorney

UNITED STATES PATENT OFFICE.

WILLIAM N. AMORY, OF NEW YORK, N. Y.

SHOCK-ABSORBER FOR VEHICLES.

1,337,579.  Specification of Letters Patent.  Patented Apr. 20, 1920.

Application filed June 5, 1918. Serial No. 238,250.

*To all whom it may concern:*

Be it known that I, WILLIAM N. AMORY, a citizen of the United States, residing at New York, in the county and State of New York, have invented certain new and useful Improvements in Shock-Absorbers for Vehicles; and I do hereby declare the following to be a full, clear, and exact description of the invention, such as will enable others skilled in the art to which it appertains to make and use the same.

My present invention relates to an improved and novel construction for use upon aeroplanes, automobiles and, indeed, vehicles of all kinds, whereby shocks and vibrations due to travel over rough surfaces are absorbed or dissipated. In its application to aeroplanes, my improvement successfully relieves the aviator from the shock incident to landing, or at least greatly lessens its effect.

My present invention provides means which serve to resist both the primary upward thrusts due to rough roads and the secondary shock due to rebound and exerted in the opposite direction. My improved device is intended for local application to critical points in vehicle construction and may either be used alone or in combination with the usual springs of a vehicle, according to circumstances.

Figure 1:
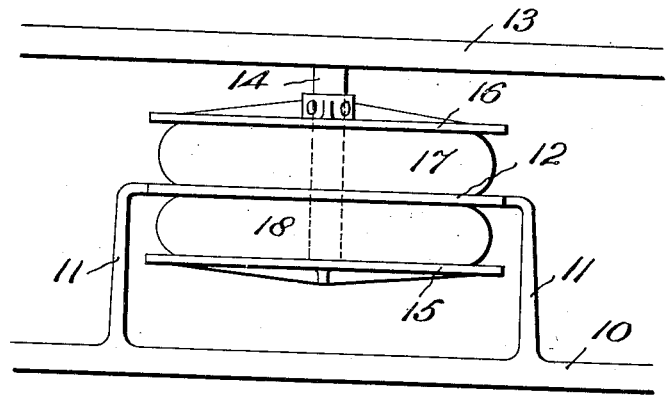
Figure 2:
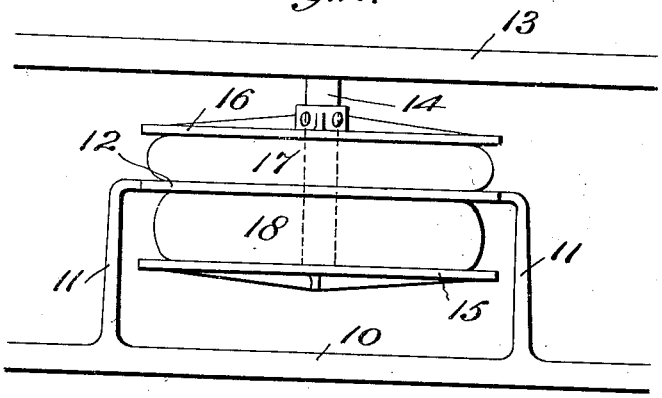
Figure 3:
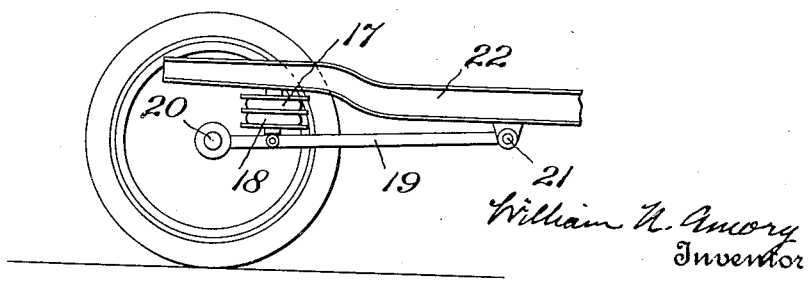
Figure 6:
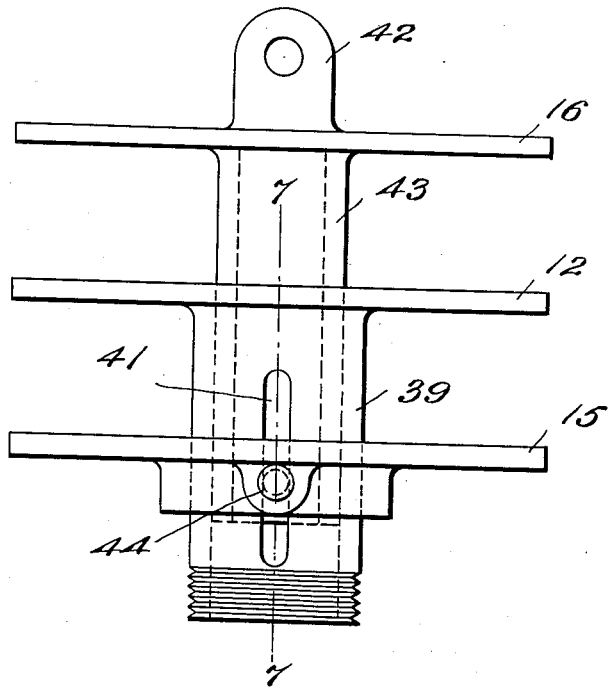

My invention is illustrated in certain preferred forms in the accompanying drawings, wherein Figure 1 is an elevation of my device in its general relation to the lower member (chassis, axle, etc.) and to the upper member of a vehicle, Fig. 2 shows the same as modified by an upward thrust or shock, Fig. 3 shows in elevation one mode of local application of the device, Fig. 4 is a rear elevation of an automobile supplied with my device at each end of each axle, Fig. 5 is a side elevation of a portion of an aeroplane, showing one mode of applying my device thereto, the wheel next the observer being removed, Fig. 6 is a side elevation of the preferred form of pressure plate mounting used in the devices shown in Figs. 3, 4 and 5, and Fig. 7 is a vertical section of a portion of the same.

In Fig. 1, the lower vehicle member, such as the chassis, truck or axle, is indicated at 10. Attached to this member by suitable supports 11, is a middle plate 12.

The upper member 13 is provided with a column 14 which passes downward through the plate 12, and to the bottom of which is fastened the lower plate 15. This column may be screwed into the upper member and lower plate, or may be otherwise fastened thereto. The column 14 also passes through an upper plate 16 which is made fast to it near to where the column joins the upper member.

Inserted between the upper plate 16 and the middle plate 12 is an inflatable pneumatic cushion 17 having resilient walls and of general toric form. A similar cushion 18 is placed between the lower plate 15 and the middle plate 12. The relative distensions or degrees of inflation of these cushions as well as the relative strength of their walls may be adjusted to correspond to their respective duties. For instance, in an ordinary automobile or other road vehicle, the upper cushion will generally be made more resistant than the lower cushion, because normally it carries a proportion of the weight of the body and contents at all times.

In Fig. 3 I have shown one specific mode of application of my device in connection with one wheel of a vehicle. It is to be understood that each of the wheels is supplied with a separate double cushion as shown, whereby the individual shock conditions of each wheel are independently taken care of at each moment of time. In this figure the wheel is carried by an axle 20 mounted on the end of a bar 19, whose opposite end is pivoted at 21 to the framework 22 of the vehicle. This latter may be the upper body framework or a part of a chassis which carries the body on springs or otherwise. My device is located, as shown, between a point near the outer end of the bar 19, and the framework 22.

In Fig. 4 is shown the mode of mounting my device upon an automobile or other road vehicle, wherein a separate shock-absorbing unit, or double cushion, is applied to each wheel separately. In the drawing the vehicle body is shown at 23 and the four wheels at 24, 25, 26 and 27 respectively. In the specific form shown, the cushions 17, 18, on each side are combined with springs 28 and 29.

In this figure I have shown a possible condition wherein the utility of my device in this mode of application is clearly made evident. It is, of course, to be understood that the front axle is provided at its two ends with two shock absorbers, not shown, in the same manner as the rear axle. The vehicle is supposed to be moving forward and to have met with two raised points or humps 30 and 31. The hump 30 has lifted the left front wheel 26 at the same time that the right rear wheel 25 is lifted. The two axles are thus simultaneously canted in opposite directions. Ordinarily this would produce a rocking of the vehicle and a very unpleasant bumping effect on the passengers, since the springs do not yield with sufficient promptitude to provide for such a condition, and rather increase the discomfort than relieve it by their belated reaction.

My cushions, on the other hand, yield instantly and maintain the vehicle body in a practically horizontal and even state. This is accomplished by the reactions illustrated in Figs. 2 and 4. When the upward thrust comes upon the axle, the middle plate 12 causes the upper cushion 17 to distend horizontally while growing flatter, as shown in Fig. 2. At the same time, the lower cushion thickens correspondingly and occupies the increased space between the lower plate 15 and the middle plate 12.

In the case shown in Fig. 4, the condition just described is produced at the right hand end of the rear axle by the lifting of the wheel 25, while the opposite action instantaneously takes place at the left hand end, that is to say, the cushion 17 thickens while the cushion 18 flattens and distends horizontally. Corresponding effects are produced at opposite ends of the front axle, and the result is that the body 23 is kept substantially even, and the shocks otherwise produced are prevented.

In Fig. 5 the body of an aeroplane is indicated at 32, and here each wheel 33 is provided with a pair of cushions 17, 18. The wheels are mounted on an axle 34 forming the lower member for my device, and steadied by a bar or bars 35 pivoted at 36 to a frame 37. The upper member for my shock absorber is formed by a column 38, joining the upper and lower plates to the body 32. The shocks incident to landing will be greatly lessened or quite prevented by this construction.

Figure 7:
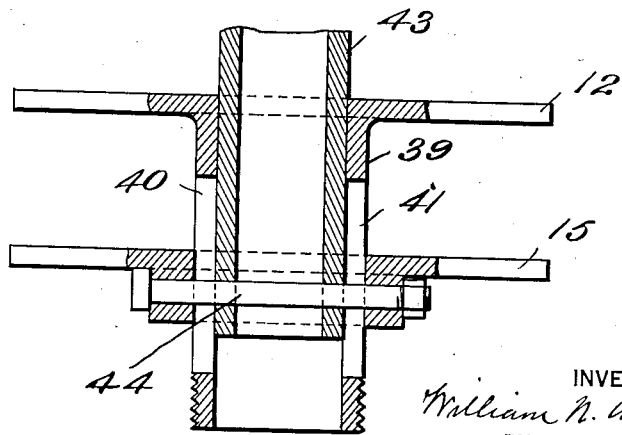

In Figs. 3, 4 and 5 the means whereby the middle plate is connected with the lower member of the vehicle while the upper and lower plates are connected in common with the upper member are not fully shown. Such means may take a variety of forms, one of which is illustrated in Figs. 6 and 7, not herein specifically claimed.

For this purpose the middle plate 12 is fastened to the lower member by a sleeve 39, slotted on diametrically opposite sides as at 40, 41. The upper plate 16 is fastened in any desired manner, as by the pierced lug 42, to the upper vehicle member, and is provided with a sleeve 43, which fits and slides within the sleeve 39. The lower plate 15 is fastened to this sleeve 43 by a pin 44, passing through the slots 40, 41. It will be seen that this arrangement provides for a permanent connection between the upper and lower plates, and allows them to move longitudinally for a limited distance relatively to the middle plate and its sleeve.

It is to be understood that my cushions may be made of rubber or other resilient material and that any well known expedients may be employed for reinforcing, protecting and strengthening the same. Various changes may be made in my device and its related structures without departing from my invention and I do not limit myself to the details herein shown and described.

What I claim is—

1. A shock absorbing unit between the upper and lower members of a vehicle, comprising two outer abutments fixed to one member, a middle abutment located between said outer abutments, a horizontally distendible pneumatic cushion having resilient walls and placed between the upper and middle abutments, and a similar cushion, also horizontally distendible placed between the lower and middle abutments.

2. A device of the character set forth generally in claim 1 hereof, wherein the outer abutments take the form of plates fixed to a column attached to one member of the vehicle and wherein the middle abutment takes the form of a plate fixed to the other vehicle member by mechanical connections spanning one of the outer abutments.

3. A device of the character set forth generally in claim 1 hereof, wherein the cushions are of toric form, free to expand and contract radially in the horizontal plane, both within and without the toric circle.

4. A shock absorbing unit of the general character set forth in claim 2 hereof wherein the upper and lower plates are fastened on a column passing through the middle plate and fixed to one of said members.

In testimony whereof I affix my signature

WM. N. AMORY.